Patented Apr. 15, 1947

2,419,038

UNITED STATES PATENT OFFICE 2,419,038

METHOD FOR THE PREPARATION OF TARTARIC ACID VALUES

Marshall T. Sanders, Brandywine Hundred, Del., assignor to Atlas Powder Company, Wilmington, Del., a corporation of Delaware No Drawing. Application February 16, 1943, Serial No. 476,055

4 Claims. (Cl. 260—528)

The present invention relates to the nitric acid oxidation of carbohydrate materials to valuable acids, and more particularly to the oxidation of glucose-containing materials to produce tartaric and oxalic acids.

An object of the invention is to provide a more efficient and economical process for oxidizing carbohydrate materials, particularly glucose, or polysaccharides capable of yielding glucose rapidly on hydrolysis, to the industrially valuable tartaric and oxalic acids.

A further object of the invention is to provide a process for obtaining high tartaric and oxalic acid yields from carbohydrate material with small carbon loss in the form of other products.

Another object is to provide a rapid process for the production of tartaric and oxalic acids.

Other objects will become apparent from the following description.

The copending application of Solomon Soltzberg, Serial Number 443,694, filed May 20, 1942, now Patent Number 2,380,196, describes a commercially operative process for the production of tartaric acid and oxalic acid by catalytic nitric acid oxidation of carbohydrate material. The present invention is another improvement in the operation of the same general reaction.

The oxidation of carbohydrate material to tartaric and oxalic acids, it is believed, proceeds by scission of the carbon chain and oxidation of aldehydic, ketonic and/or hydroxyl groups through a number of intermediately oxidized products. Furthermore, the tartaric acid formed is further oxidizable to oxalic acid, which in turn yields carbon dioxide as an oxidation product. Carbon dioxide represents a carbon loss, and oxalic acid, to the extent that it results from decomposition of tartaric acid, is undesired. It is sought to oxidize, insofar as possible, only to tartaric acid and such oxalic acid as may be produced from portions of the carbon chain not oxidizable to tartaric acid. It is not practicable to achieve such perfect operation. Since the oxidation proceeds through a number of products of differing susceptibility to oxidation, tartaric acid accumulates only gradually in the reaction mixture as oxidation takes place. A considerable quantity of tartaric acid is believed to be decomposed to carbon dioxide and oxalic acid before recoverable amounts are formed. Soltzberg eliminates a very pronounced amount of this decomposition as is more fully explained in his application mentioned above.

According to an embodiment of the Soltzberg application, the oxidation process is performed cyclically. Fresh carbohydrate and residue containing intermediately oxidized products from a prior oxidation are oxidized with nitric acid in the presence of a catalyst. After nitrogen and nitrogen compounds have been exhausted, tartaric acids and oxalic acid are removed from the reaction mixture and the residue left, which contains intermediately oxidized products, may be recycled with more fresh carbohydrate in a further cycle, and so on. Soltzberg prefers to perform the oxidation under carefully controlled conditions and in a stagewise manner. He teaches that he can employ, after a preliminary mixing of fresh carbohydrate, residue, and nitric acid oxidizing agent, as a first stage, a heating-up period. He may follow this with the "blow" or main reaction period, in which temperature is maintained at a higher value. Soltzberg prefers to follow the blow period with a nitric acid "fume-off" period in which the reaction is completed, for removal of nitrogen acids is usually necessary for convenient removal of tartaric and oxalic acid products. The fume-off period is conducted until evolution of nitrogen oxides and nitric acid from the reaction mixture ceases. This period is apt to be quite prolonged since it involves reacting the nearly spent nitric acid in solution with the already partially oxidized, and hence somewhat resistant, oxidation mixture. Times of about 4 hours are usually required for this period. Furthermore, since the fume-off is usually conducted at an elevated temperature, as in the neighborhood of 95° C., the evolved oxides of nitrogen are diluted by considerable water vapor, making more difficult the subsequent regeneration of nitric acid which is important for most economically efficient operation.

According to my invention the residue from a previous run which has been stripped of its oxalic and tartaric acid values is reacted with fresh, strong nitric acid, the reaction being allowed to proceed under controlled conditions until it has moderated somewhat, and then the residual nitric acid is reacted off rapidly by adding fresh, readily-oxidizable carbohydrate material. A heating or fume-off period from about the time of the addition of fresh carbohydrate material may desirably accelerate the nitric acid removal. The oxidation mixture is then stripped of tartaric and oxalic acids and the residue returned for further oxidation in a subsequent cycle.

By this method of operation I have found it possible under preferred conditions to cut down the time for each cycle from about 6 hours in the Soltzberg process to 2 hours or less, for I eliminate most of the time previously consumed in the relatively inefficient fume-off operation. Also, the blow period in my process is not as violent as that in other processes because in my operation fresh nitric acid is not mixed with violently reactive fresh carbohydrate material; rather, fresh nitric acid is reacted with the not so readily oxidizable residue, and then the nitric acid after being partly spent is reacted with fresh carbohydrate material. In my process, accordingly, the oxidation is much easier to keep in hand. Another advantage is that with less operation at the higher fume-off temperatures there is less water dilution of evolved vapors, and nitric acid regeneration is, in consequence, easier. Furthermore, the efficiency of the process of this invention is higher than any heretofore known. The principal difference in efficiency is in the oxalic yield which may reach 65% under preferred conditions in the present process and of this 65%, about one-half separates as free oxalic acid in the present process, while in other processes usually only 30% of the oxalic acid produced separates as such. The remainder must be separated by chemical means, as, for example, by preparing insoluble salts or volatile esters. Since the removable compounds themselves cannot always be readily marketed but often must be converted to the free acids, the higher yield of free oxalic acid represents a distinct economical advantage for my process.

Fresh carbohydrate material may be added at other stages than the beginning of a fume-off period, and some of the advantages of this invention will still be retained. For example, some may be added during the blow but after the peak activity of the blow period as may be determined by a lessening of heat output, or some may be added with the residue at the beginning of the cycle and the remainder at a later stage, most desirably at the beginning of the fume-off period.

I have found that a number of features of procedure in reaction control are important to the obtention of optimum yields. For starting material I may use water-soluble carbohydrate materials oxidizable in solution by nitric acid to oxides of carbon and water soluble compounds including tartaric acids, oxalic acids, and a residue containing intermediates further oxidizable by nitric acid to tartaric and oxalic acids. By the term "carbohydrate material," I mean to include not only compounds containing carbon, hydrogen, and oxygen, the latter two being in the proportions in which they occur in water, but also other polyhydroxylic materials, such as hexitols, pentitols, erythritol, sugar acids, including aldonic and ketonic acids, other similar materials, and materials readily hydrolyzable to these. Such materials are now commonly classed with carbohydrates. Most hexoses, such as fructose or mannose, and particularly d-glucose which is available in pure form free from ash, of constant composition, and at a low price, are readily usable in my process. Carbohydrate materials readily hydrolyzable by acid to other starting materials are equivalent to those materials. Among such materials, I include oligo- or polysaccharides, such as starch, dextrine, corn syrup, sucrose and high test molasses (partially inverted raw cane sugar) which readily hydrolyze to hexoses. Butadiene dioxide, which hydrolyzes readily to erythritol, may also be used in my process. An available and advantageous group of starting materials is that composed of glucose, fructose, the pentoses, gluconic acid, erythritol, 5-keto- gluconic acid, and materials which readily hydrolyze to these. I cannot use, and exclude from my invention, galactose which oxidizes to insoluble mucic acid, nor can I use, and hence I exclude, other carbohydrates which oxidize to insoluble intermediate products, for insolubles are not practicably further oxidizable in my reaction. With the exception of d-glucose and sucrose, the presently commercially available saccharide materials (economically useful) sometimes have relatively high ash contents. The ash content may cause difficulty in a cyclic process due to build-up in the residue and often not as many cycles can be performed. Sucrose, while obtainable ash-free, gives lower yields of d-tartaric acid than does glucose. It is understood that various less desirable saccharide materials can be rendered more suitable as starting materials by proper de-ashing or de-mineralizing as, for example, by ion exchange methods.

I may introduce nitric acid oxidizing agent into the reaction mixture as such, in which case I prefer that it contain a little lower oxide of nitrogen which appears to act catalytically toward the reaction; or I may form it in situ by passing into the reaction mixture a mixture of oxidizable nitrogen oxides and air or other gas containing free oxygen or by using higher oxides of nitrogen which have been formed outside the reaction mixture.

The reaction requires a catalyst to give a practical yield of tartaric acid. Any oxidation catalyst directive for tartaric acid production, a number of which are known in the art, can be used. Various polyvalent metal compounds are operative for this purpose, including compounds of vanadium, manganese, iron and molybdenum. Vanadium in the form of its soluble pentavalent compounds, such as sodium orthovanadate hexadecahydrate ($Na_3VO_4 \cdot 16H_2O$) is one of the most efficient catalysts and is preferred by me.

The oxides of nitrogen evolved from the reaction, which contain somewhat less than about 10% nonrecoverable nitrogen as $N_2$ or $N_2O$, can be converted to nitric acid without further purification, either at atmospheric pressure or after compression, as for example, to the customary 6–7 atmospheres; or they may be oxidized and absorbed in the reaction mixture.

It is of considerable procedural advantage to maintain one constantly repeating set of conditions by keeping successive cycles uniform. To accomplish such operation, conditions should be regulated so that equilibrium among the cycles is maintained, that is, so that each cycle produces and consumes the same amount of residue. In addition to the conditions of temperature and time given above, other ranges of operational conditions will be further useful for the obtention of optimum yields. Such conditions usually depend somewhat upon the particular carbohydrate material employed. Conditions exemplary for the carbohydrate glucose are given below. They will also, however, be found indicative when applying the process to other carbohydrate materials.

I have found that, using glucose and after building up a quantity of residue, the weight ratio of nitric acid to total carbon in residue and fresh carbohydrate material may advantageously be kept approximately within the range of 2.5 to 3.0. For the initial oxidations, in starting the process before equilibrium is established in successive cycles, the ratio may be lowered to allow rapid building up of residue. Acid concentrations (calculated as aqueous $HNO_3$ without reference to solids content of carbohydrate material and/or residue) may be varied considerably. A value of approximately from 45 to 70% will usually be found practical. A convenient concentration is about 55%, as this allows the use of ordinary 62% nitric acid for make-up with the concentrated aqueous solution of residue.

As indicated above, I, like Soltzberg, prefer to conduct my reaction in a series of temperature stages; a heating-up stage, a blow or main reaction stage, and a fume-off or reaction completion stage. The heating-up period between the mixing of catalysts, residue and acid and the onset of the strongly exothermic reaction, or blow, is not very critical. A time of from 20 to 40 minutes is convenient. It may be shortened by increasing the lower oxide content of the nitric acid used, by the addition of nitrite radical, or by heating. Too rapid a heating-up period makes control of the more strongly exothermic blow more difficult. The temperature at which the blow is conducted may have considerable effect on the efficiency of the reaction. Too high temperatures increase decomposition and the production of undesired oxidation products. Too low temperatures on the other hand unduly prolong the reaction. I find that the range of temperatures between about 60 and 80° C. is generally quite satisfactory although temperatures outside this range may be employed. The usual preferred temperature is about 70° C. Since the blow period is usually autocatalytic and highly exothermic for the most part, cooling is generally necessary for temperature control. With the temperature conditions given above the blow is maintained conveniently from one-half to two hours. I prefer a period of about one and one-half hours. Shorter blow periods increase the amount of reaction which takes place in the fume-off period, since more nitric acid then survives for removal at this stage. Reaction at the temperature of the fume-off for fresh carbohydrate is not as efficient as at lower temperatures. Also carrying the reaction too long in the blow stage fails to utilize the advantages of adding fresh carbohydrate materials after the reaction peak. Accordingly, the duration of the blow period controls to a considerable extent both the size of the residue, and the amount of surviving nitric acid, so that the duration of the blow should, for best results, be kept within the preferred limits. To some extent, however, a shorter reaction time may be compensated for by increasing the acid ratio.

After the blow period, I start the fume-off period. It is then that I prefer to add fresh carbohydrate materials and raise the temperature to denitrify the solution and effect oxidation of the fresh carbohydrate materials. Again, as in the blow, the particular temperature employed should be low enough to prevent undue decomposition and overoxidation, but high enough to permit completion of the reaction in a reasonable time. Temperatures between about 85 and 100° C. have usually been found quite practical for the fume-off period. In general, I prefer to operate at about 95° C. This period is preferably carried to the point where nitrogen oxides are no longer evolved from the solution as may be determined by odor or test with starch-iodide paper, for nitrogen compounds usually interfere with product recovery. Times of less than one-half hour are usually sufficient for this step. The oxidized mixture should then be treated to remove the oxalic and tartaric acids formed.

The ratio of residue carbon to fresh carbohydrate material carbon will depend somewhat on the acid to total carbon ratio. Larger acid ratios usually require the use of lower residue carbon to fresh carbon ratios. However, too high acid ratios tend to give inefficient conversions to the desired acids and unduly high carbon losses. Too low acid ratios also tend to give inefficient conversions to the desired acids and therefore are likewise greatly undesirable. Too low acid ratios also tend to make separation of oxalic and tartaric acid values from the reaction more difficult. Using acid ratios as given above, I usually employ a residue carbon, fresh carbon ratio, between about 1.30 and 1.60.

The carbon contents which determine these ratios may be readily determined by customary methods such as combustion analysis or wet methods as for example that taught by Pollard and Forsee, Industrial and Engineering Chemistry, Analytical Edition, vol. 7, p. 77 (1935).

Fresh catalyst is generally necessary for each cycle to insure good yields of tartaric acids, as catalyst usually is removed from the reaction during the product recovery procedures ordinarily employed. Using the preferred catalyst, sodium orthovanadate hexadecahydrate, the most efficient quantity has been found to lie in the range of about 0.01 to 0.03% of catalyst based upon the weight of fresh glucose employed.

The removal of oxalic and tartaric acids from the reaction mixture may be accomplished by any convenient method. The bulk of the oxalic acid is readily removable as such by simple cooling and crystallization. The remainder of the oxalic acid and the tartaric acid may be removed by zinc salt precipitation or calcium salt precipitation or ester separation, as disclosed in the aforementioned Soltzberg application. While these methods do not all effect complete removal of tartaric acid, the degree of separation is sufficient for practical purposes since much of the tartaric acid that remains in the residue is recovered in subsequent cycles.

Choice of the recovery method will be controlled, at least in part, by the nature of the tartaric acid values desired and their utilization. If the tartaric acid values are to be utilized as liquid esters, such as dibutyl tartrate, the esterification method offers obvious advantages. If, on the other hand, interest is centered chiefly on the d-tartaric acid, then the salt methods are to be preferred. For example, zinc tartrate can be converted to free tartaric acid by treatment with oxalic acid and the d-tartaric separated from meso-tartaric by precipitation as the acid potassium salt or by fractional crystallization.

*Example*

The cycle is initiated by oxidizing fresh carbohydrate to build up a residue. 100 parts of d-glucose, 174.8 grams of pure $HNO_3$, added as 55% nitric acid, and 0.015 gram of $Na_3VO_4.16H_2O$ were mixed cold. The temperature was allowed to rise spontaneously for 36 minutes during the heating-up period, until the rapid, strongly exothermic blow set in at about 70° C. The temperature was held at this point for 1.5 hours, whereupon a fresh quantity of 100 parts of glucose was added and the temperature raised to 95° C. for the fume-off period. After 15-20 minutes at this temperature, all the nitric acid had been removed from the reaction mixture as volatile oxides of nitrogen, as was determined by testing with starch-potassium iodide paper.

The oxidation liquor, on cooling to 4–6° C. for 16 hours, yielded 16.4 grams of oxalic acid dihydrate. The filtrate and washings from the latter were combined and treated with 13.7 grams of a basic zinc carbonate, equivalent to 15% of the total titratable acidity of the filtrate. This threw down a zinc oxalate precipitate equivalent to 13.2 grams of oxalic acid dihydrate. This was filtered off, and to the filtrate a further 45.9 grams of the zinc carbonate, equivalent to 50% of the total initial filtrate acidity, was added to precipitate the tartrates. Zinc tartrates equivalent to 20.3 parts tartaric acids were obtained. The zinc-bearing filtrate from the zinc tartrates was then de-zincked by adding a stoichiometric amount of free oxalic acid dihydrate, namely, 25.4 grams. The residue was then evaporated to 73.8% solids. It contained 168 grams of solids, equivalent to 62.83 grams of carbon. All zinc precipitations were made at 65°–70° C. stirring for at least an hour.

The aqueous residue thus obtained was re-oxidized as above using the residue in place of the original glucose, using nitric acid equivalent to 273.3 grams of 100% HNO$_3$, enough water to give a 55% acid, and 0.015 gram of the hydrated catalyst. The same time-temperature schedule was kept as in the initial oxidation, 100 grams of fresh glucose being added after 1.5 hours reaction at 70° C. The amount of nitric acid used was adjusted to keep an approximately constant ratio with the weight of total carbon, in the interest of uniformity, the ratio being approximately 2.65 figured on weight of 100% nitric acid. Recovery and removal of the oxalic and tartaric acids were as described above, using basic zinc carbonate equivalent to 15 and 50% respectively of the total acidity of the filtrate from the free oxalic, to bring down the residual oxalate and the tartrates, and de-zincking the residue before reoxidation.

In this way 5 cycles were run through, giving the results shown below. All weights are in grams.

| Cycle No | 1 | 2 | 3 | 4 | 5 | Av. 2–5 |
|---|---|---|---|---|---|---|
| Dry Weight residue | | 166.9 | 174.8 | 162.2 | 151.6 | 163.9 |
| Wt. carbon in residue | | 62.38 | 66.21 | 59.35 | 58.01 | 61.5 |
| Wt. glucose, dry | 200 | 100 | 100 | 100 | 100 | 100 |
| Wt. 100% HNO$_3$ | 175.0 | 273.3 | 290.1 | 259.7 | 254.2 | 269.3 |
| Wt. oxalic acid dihydrate obtained | 29.6 | 52.4 | 79.2 | 66.4 | 63.2 | 65.3 |
| Wt. tartaric acid | 20.3 | 27.9 | 53.0 | 45.4 | 43.3 | 42.4 |
| Per cent carbon in residue (Dry basis) | 37.4 | 37.9 | 36.6 | 38.3 | 37.3 | 37.5 |

In each cycle, 0.015 fresh catalyst based on fresh sugar was added to the residue before oxidation, and the weight ratio of 100% HNO$_3$ to residue carbon was maintained at approximately 4.38. (This is equivalent to an acid/total carbon ratio of about 2.65.)

The yields, which are expressed as weight ratio of product to glucose, of tartaric acid (42.4%) and oxalic acid dihydrate (65.3%), calculated from the average of cycles 2 to 5, represent a 65% carbon recovery as useful products.

The above example has described the oxidation as carried out in batch operation. However, my process can also be conveniently operated in a continuous manner, for example, nitric acid and residue may be continuously fed into a reaction system made up of successive zones in which are maintained temperature conditions corresponding to the desired temperature stages, such as the blow and fume-off periods. Fresh carbohydrate material may be added at an appropriate point in the system, preferably at the beginning of the fume-off period, and solution from which recovery of product is to be made may be continuously drawn off. Under continuous operation I have found the heating-up stage may be usually merged with the blow.

Other procedural modifications of the invention and variations to fit conditions in hand will be obvious to those experienced in this field.

What I claim is:

1. A cyclic process for the production of tartaric and oxalic acid values which comprises reacting a material of the type of the residue hereinafter described, with nitric acid, in the presence of a catalyst directive for tartaric acid production, allowing the reaction to proceed until it moderates, then adding a carbohydrate material selected from the group consisting of glucose, fructose, pentoses, gluconic acid, 5-ketogluconic acid, erythritol, and materials readily hydrolyzable to these by dilute nitric acid, and allowing the reaction to continue until nitric acid and nitrogen oxides cease to be evolved and are substantially entirely removed, the proportions of reacting ingredients and the conditions of operation being such that tartaric acid, oxalic acid, and a residue containing intermediate products further oxidizable to tartaric and oxalic acids are formed, and removing tartaric and oxalic acids, thereby leaving said residue suitable for reaction in a subsequent cycle.

2. A process according to claim 1 in which the carbohydrate material is d-glucose.

3. A process according to claim 1 in which the catalyst employed is a soluble orthovanadate.

4. A cyclic process for the production of tartaric and oxalic acids which comprises reacting a material of the type of the residue hereinafter described with nitric acid, in the presence of a soluble orthovanadate, the ratio of nitric acid to total carbon being approximately within the range of 2.5 to 3.0, allowing such reaction to proceed at a temperature of about 60 to 80° C. for a period of from approximately 0.5 to approximately 2 hours, then adding d-glucose in amount such that the ratio of residue carbon to d-glucose carbon will be approximately within the range of 1.3 to 1.6 at a temperature maintained approximately within the range of 85 to 100° C. until nitric acid and nitrogen oxides cease to be evolved from the reaction mixture and are substantially entirely removed, removing tartaric and oxalic acids from the reaction mixture, leaving a residue containing intermediate products further oxidizable to tartaric acid and suitable for reaction in a subsequent cycle.

MARSHALL T. SANDERS.

REFERENCES CITED

The following references are of record in the file of this patent:

UNITED STATES PATENTS

| Number | Name | Date |
|---|---|---|
| 2,057,119 | Simpson | Oct. 13, 1936 |
| 1,870,472 | Stokes et al. | Aug. 9, 1932 |
| 1,446,012 | Volsky | Feb. 20, 1923 |
| 1,425,605 | Odell | Aug. 15, 1922 |
| 1,157,348 | Porthens | Oct. 19, 1915 |
| 2,257,284 | Stokes et al. | Sept. 30, 1941 |
| 2,322,915 | Brooks | June 29, 1943 |